Patented Nov. 23, 1937

2,099,689

UNITED STATES PATENT OFFICE 2,099,689

WATER-INSOLUBLE METAL SALTS OF PHTHALOCYANINE-SULPHONIC ACIDS

Karl Holzach and Georg Niemann, Ludwigshafen-on-the-Rhine, Germany, assignors to General Aniline Works, Inc., New York, N. Y., a corporation of Delaware No Drawing. Application April 18, 1936, Serial No. 75,234. In Germany April 20, 1935

7 Claims. (Cl. 260—11)

The present invention relates to water-insoluble metal salts of phthalocyanine sulphonic acids.

By heating derivatives of aromatic ortho-dicarboxylic acids which are formed by the combination of nitrogen to the carbon atoms of the two adjacent carboxylic groups, or their substitution products, such as phthalodinitrile, ortho-cyanobenzamide or naphthalene ortho-dicarboxylic acid dinitrils, either alone or together with metals or metal compounds or other substances, valuable colored products, the so-called "phthalocyanines", are obtained which may be subsequently sulphonated when they do not already contain sulphonic groups.

We have now found that valuable water-insoluble salts of the sulphonic acids of the phthalocyanines which hereinafter are called "color lakes", can be obtained by treating, in aqueous solution, the said sulphonic acids with metal compounds suitable for laking, in particular soluble metal salts, metal oxides or metal hydroxides. The sulphonic acids, in the form of their alkali metal salts, are soluble in water giving a deep blue coloration and are preferably employed as such according to this invention. Suitable metal compounds for laking are for example the soluble salts, oxides and hydroxides of calcium, strontium, barium, magnesium, aluminium, iron, cobalt, zinc, manganese and nickel. In many cases it is advantageous to allow the laking to take place in the presence of additional substances such as resin soaps, soluble synthetic resins or dispersing agents. Either a neutral, acid or alkaline medium may be employed.

The following examples will further illustrate how the said invention may be carried out in practice but the invention is not restricted to these examples. The parts are by weight.

Example 1

7 parts of the sodium salt of the sulphonic acid of the blue substance obtainable by heating phthalodinitrile in the presence of cuprous chloride and pyridine (prepared by sulphonation of the blue substance with five times the amount of 30 per cent oleum while heating for an hour at 80° C., pouring onto ice and neutralizing by the addition of sodium carbonate with subsequent salting out) are dissolved in 100 parts of water, heated and precipitated by the addition of 9 parts of barium chloride. A brilliant green-blue color lake is obtained.

A corresponding amount of calcium chloride or zinc chloride may be employed instead of barium chloride. A similar procedure is followed when employing magnesium or manganese salts for the laking.

Example 2

10 parts of the sodium salt specified in Example 1 are added to an aqueous suspension of 200 parts of aluminium hydroxide. The brilliant blue alumina lake is isolated and dried in the usual manner.

Example 3

20 parts of heavy spar are suspended in a solution of 10 parts of aluminium sulphate and 5 parts of soda in 135 parts of water and mixed with a solution of 12 parts of barium chloride in 88 parts of water. The precipitate is washed by repeatedly spraying it with water and decanting and suspended in a solution of 1.5 parts of the sulphonic acid of copper phthalocyanine (cf. Example 1) and 1.5 parts of the azo dyestuff from diazotized 1,2,5-aniline-sulphonic acid and 1(2',5'-disulphophenyl)-5-pyrazolone-3-carboxylic acid in 300 parts of water. The dyestuff is precipitated by adding a solution of 3 parts of barium chloride in 30 parts of water. The color paste separated by filtration may be brushed on wall paper together with vegetable glue, a fast, brilliant green painting being obtained.

More greenish color shades are obtained if instead of a copper-phthalocyanine-sulphonic acid, a sulphonic acid of the phthalocyanine free from metal is employed.

Example 4

2 parts of the sodium salt of the nickel-phthalocyanine-sulphonic acid prepared by causing 300 parts of 33 per cent oleum to act on 30 parts of a nickel-phthalocyanine (obtainable by heating ortho-phthalodinitrile and nickelous chloride in the presence of quinoline at between 200° and 210° C. for several hours) at 25° C. within 2 hours, are dissolved in 1000 parts of water. To this solution there is added a precipitate freshly prepared from 20 parts of barium sulphate, 10 parts of a 10 per cent aqueous solution of aluminium sulphate, 5 parts of an about 10 per cent aqueous solution of sodium carbonate and 12 parts of an about 10 per cent aqueous solution of barium chloride.

The color lake is then precipitated on the substratum by the addition of 3 parts of barium chloride. The color paste obtained yields a brilliant green-blue coating.

Example 5

A zinc-phthalocyanine-sulphonic acid obtained by treating 30 parts of zinc-phthalocyanine prepared for example by heating ortho-phthalodinitrile with zinc oxide and formamide with 300 parts of 33 per cent oleum at 50° C. within 35 minutes is made into a lake in the manner described in Example 4. A brilliant green color lake is thus obtained.

Example 6

100 parts of copper phthalocyanine are entered into a mixture of 500 parts of sulphuric acid monohydrate and 500 parts of 65 per cent oleum and kept at 25° C. for 24 hours. The mixture is then poured onto ice and the resulting copper-phthalocyanine-monosulphonic acid is converted into the sodium salt in known manner. The dyestuff thus obtained is introduced into 20,000 parts of water, mixed with 100 parts of a 10 per cent solution of resin soap and precipitated by means of 280 parts of a 10 per cent solution of barium chloride. The color lake is allowed to deposit, decanted and then pressed off. It has a brilliant blue shade.

Example 7

2,3-dicyan-naphthalene is converted into a phthalocyanine by heating it with a mixture of nitrobenzene, pyridine and cuprous chloride. The resulting dyestuff is sulphonated by treating it with 30 per cent oleum at room temperature.

The sodium salt of this sulphonic acid which is readily soluble in water is made into a lake in the manner similar to that of Example 4. A brilliant green color lake is thus obtained which is especially suitable for coloring wall papers.

Example 8

100 parts of a 2 per cent aqueous solution of the sodium salt of the metal-free phthalocyanine-sulphonic acid obtained by sulphonating the metal-free phthalocyanine (obtainable from ortho-phthalodinitrile) in 30 per cent oleum at about 70° C. are mixed with 5 parts of a 10 per cent solution of resin soap and precipitated with 5 parts by weight of a 10 per cent solution of barium chloride, a brilliant green color lake thus being obtained.

Example 9

30 parts of heavy spar are made into a paste with 10 parts of a 10 per cent aqueous solution of aluminium sulphate which latter is transformed into aluminium hydroxide by the addition of 5 parts of a 10 per cent aqueous solution of anhydrous sodium carbonate, whereupon 12 parts of a 10 per cent aqueous solution of barium chloride are added to this mixture of heavy spar and aluminium hydroxide for the formation of blancfix. 3 parts of a 1 per cent aqueous solution of the sodium salt of the sulphonic acid of copper phthalocyanine are added to the said substratum of heavy spar, aluminium hydroxide and blancfix, the said substratum having been carefully washed, and the pigment is precipitated by means of 4 parts of a 10 per cent aqueous solution of barium chloride. A color lake having a brilliant Bremen blue color shade is thus obtained.

Instead of barium chloride there may also be employed a corresponding amount of calcium chloride or zinc chloride as well as of salts of other metals, such as aluminium sulphate.

Instead of the said substratum other substrata usual in the color lake industry may also be used, such as lithopone, zinc white or calc spar.

What we claim is:—

1. A water-insoluble metal salt of a phthalocyanine sulphonic acid.

2. A water-insoluble metal salt of a sulphonic acid of a metal-containing phthalocyanine.

3. A water-insoluble salt of a light metal selected from the second and third groups of the periodic system of a sulphonic acid of a metal-containing phthalocyanine.

4. A water-insoluble salt of a light metal selected from the second and third groups of the periodic system of a sulphonic acid of copper-phthalocyanine.

5. The aluminium salt of a sulphonic acid of copper-phthalocyanine.

6. The barium salt of a sulphonic acid of copper-phthalocyanine.

7. The calcium salt of a sulphonic acid of copper-phthalocyanine.

KARL HOLZACH.
GEORG NIEMANN.